(12) United States Patent
Mitrov

(10) Patent No.: US 7,363,539 B1
(45) Date of Patent: Apr. 22, 2008

(54) RESTORING COMMUNICATION SESSIONS AND COMPONENTS WITH STATE INFORMATION

(75) Inventor: Vesselin P. Mitrov, Sofia (BG)

(73) Assignee: SAP AG, Walldorf (DE)

( * ) Notice: Subject to any disclaimer, the term of this patent is extended or adjusted under 35 U.S.C. 154(b) by 549 days.

(21) Appl. No.: 10/837,389

(22) Filed: Apr. 30, 2004

(51) Int. Cl.
*G06F 11/00* (2006.01)

(52) U.S. Cl. .............................. 714/18; 709/227; 714/4

(58) Field of Classification Search .................... 714/4
See application file for complete search history.

(56) References Cited

U.S. PATENT DOCUMENTS

| | | | | |
|---|---|---|---|---|
| 6,236,999 B1 * | 5/2001 | Jacobs et al. | .................. | 707/10 |
| 6,269,373 B1 * | 7/2001 | Apte et al. | .................... | 707/10 |
| 6,539,494 B1 * | 3/2003 | Abramson et al. | ............. | 714/4 |
| 6,684,387 B1 * | 1/2004 | Acker et al. | ................. | 717/126 |
| 6,877,111 B2 * | 4/2005 | Sharma et al. | ................. | 714/13 |
| 6,941,555 B2 * | 9/2005 | Jacobs et al. | ................ | 719/313 |
| 6,947,982 B1 * | 9/2005 | McGann et al. | ............ | 709/224 |

OTHER PUBLICATIONS

Sun Microsystems, Enterprise JavaBeans Specification, Version 2.1, DeMichiel, Linda G., Nov. 12, 2003.*
Technical Paper "Bea", Hewlett Packard Invent, Copyright 2003 Hewlett-Packard Development Company, L.P., 12 pages.
http://edocs.bea.com/wls/docs70/cluster/failover.html, "WebLogic Server 7.0", 16 pages, printed on Feb. 26, 2007.

\* cited by examiner

*Primary Examiner*—Christopher McCarthy
(74) *Attorney, Agent, or Firm*—Blakely Sokoloff Taylor & Zafman LLP

(57) ABSTRACT

A method is described in which a computing system creates an object containing information that describes a reference. The reference is used to implement a communication session. The computing system serializes the object into a byte stream. The computing system causes the byte stream to be stored outside the computing system so that the communication session can be restored on another computing system should the computing system fail.

77 Claims, 7 Drawing Sheets

RESTORING COMMUNICATION SESSIONS AND COMPONENTS WITH STATE INFORMATION

FIELD OF INVENTION

The field of invention relates generally to the software arts and more generally to restoring communication sessions and components with state information.

BACKGROUND

Component based software environments use granules of software (referred to as "components" or "component instances") to perform basic functions. Some examples of component based architectures include Java Beans (JB), Enterprise Java Beans (EJB), Common Object Request Broker Architecture (CORBA), Component Object Model (COM), Distributed Component Object Model (DCOM) and derivatives there from.

The functional granularity offered by a plurality of different components provides a platform for developing a multitude of more comprehensive tasks. For example, a business application that graphically presents the results of calculations made to an individual's financial records (e.g., amortization of interest payments, growth in income, etc.) may be created by logically stringing together: 1) an instance of a first component that retrieves an individual's financial records from a database; 2) an instance of a second component that performs calculations upon financial records; and, 3) an instance of a third component that graphically presents financial information.

Moreover, within the same environment, another business application that only graphically presents an individual's existing financial records may be created by logically stringing together: 1) another instance of the first component mentioned just above; and, 2) another instance of the third component mentioned above. That is, different instances of the same component may be used to construct different applications. The number of components within a particular environment and the specific function(s) of each of the components within the environment are determined by the developers of the environment.

Components may also be created to represent separate instances of persistent data (e.g., a first component that represents a first row of database information, a second component that represents a second row of database information, etc.).

Passivation is a feature that component based architectures have been known to have. Passivation is a technique for saving memory space within a computing system by moving components that have not been used recently from memory to another storage location (e.g., a disk drive). If a component is needed again it is moved back to memory from the storage location. A process referred to as serialization has been used to implement passivation. Serialization breaks down a component into a byte stream and then stores the byte stream into the database.

FIGURES

A better understanding of the present invention can be obtained from the following detailed description in conjunction with the following drawings, in which.

SUMMARY

A method is described in which a computing system creates an object containing information that describes a reference. The reference is used to implement a communication session. The computing system serializes the object into a byte stream. The computing system causes the byte stream to be stored outside the computing system so that the communication session can be restored on another computing system should the computing system fail.

DETAILED DESCRIPTION

1.0 Saving the State of Running Software

Figure 1A:
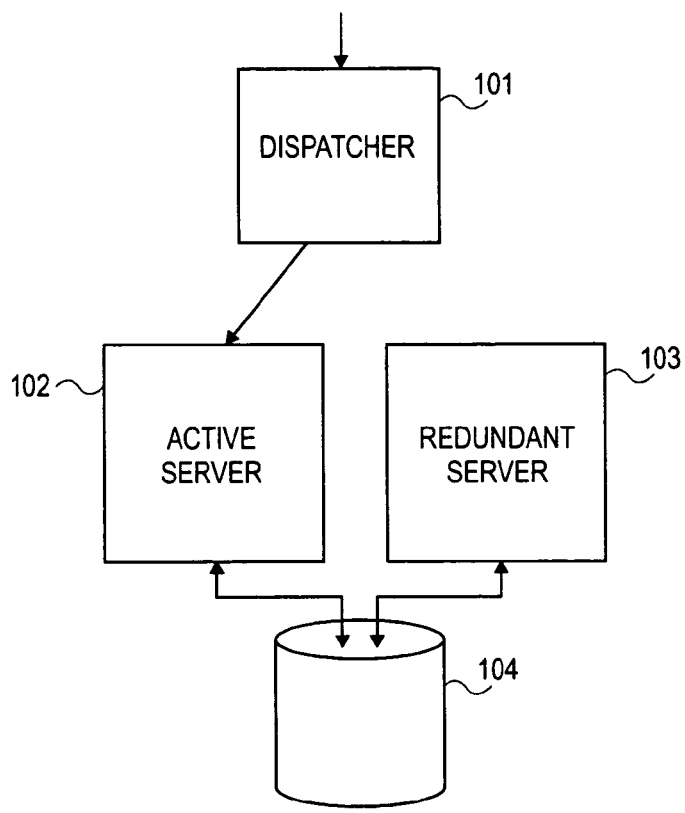
FIGS. 1a and 1b show an infrastructure capable of recovering from a computing system crash.

Passivation techniques can also be used to recover from a computing system failure (i.e., "a crash"). FIG. 1a shows a redundant computing system infrastructure. According to the approach of FIG. 1a, one of the computing systems is active (active server 102) and another computing system is redundant (inactive server 103). A dispatcher 101 sends processing requests to the active server 102 but not the inactive server 103.

Figure 1B:
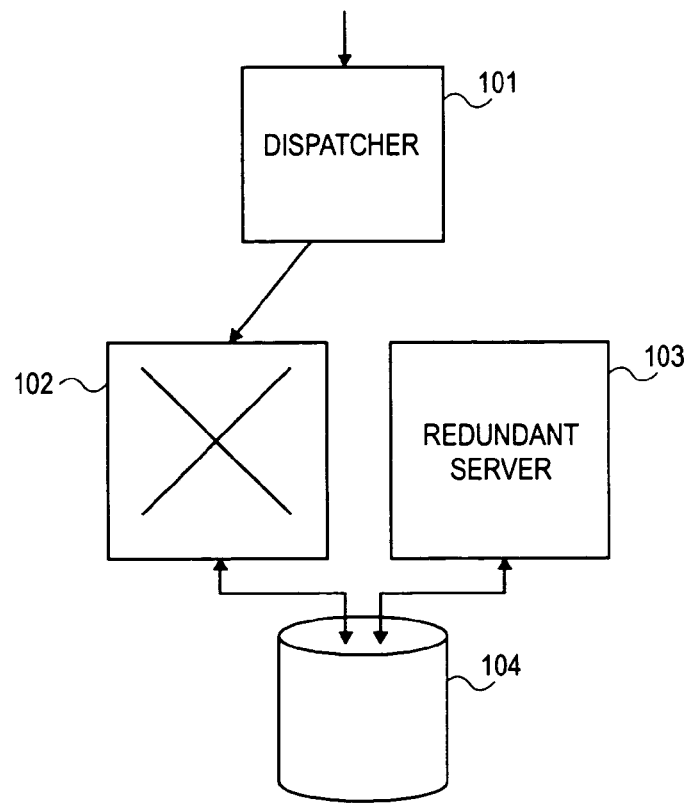

FIG. 1b shows the same infrastructure after the active computing system 102 of FIG. 1a has crashed. Upon the failure of the active computing system 102, the redundant computing system 103 becomes the active computing system and the dispatcher "switches over" so as to send processing requests to the newly appointed active computing system 103.

If computing system 102 was configured to periodically update database 104 with the state of its software components, the disruption caused by its failure could be substantially diminished. That is, as part of the transition of computing system 103 from inactive to active in response to the crash of computing system 102, the most recently updated state of the software components of computing system 102 would be loaded from database 104 into computing system 103. Thus, at least to some extent, computing system 103 would be able to "pick up" where system computing system 102 "left off".

The "state" of a computing system's software components largely corresponds to the values assigned to the variables used by the components' methods. Here, software can be viewed as executable methods that are capable of processing information. The methods themselves are typically written as processes that act with and/or upon variables. During actual execution of the methods at runtime, specific values (e.g., numeric, character, etc.) are assigned to the variables. In this manner, the methods are able to devote their processes toward specific information. Saving the state of software therefore corresponds largely to storing the values of the variables used by the software's methods. In theory, if a snapshot of all of the variables used by a software program are saved, the software routine can "pick up"

operation as of the moment the snapshot was taken at a time well beyond the moment the snapshot was taken.

Computing system 102 may use underlying techniques for implementing passivation, such as serialization, as a vehicle for storing the state of its software components into database 104. Restoring the state of the failed computing system 102 onto the redundant computing system 103 simply involves a process of "deserialization". In order to properly store the state of the software components of computing system 102, however, rather than only storing those components that have not been used recently (such as is performed with passivation), any component that undergoes a change of state (such as a change to one or more of the values assigned to its variables) should have its state change "updated" into database 104.

So doing will track the "latest state" of the software components of computing system 102 so that, when computing system 102 crashes, the contents of database 104 will (as best as practicable) reflect the state of computing system 102 at the time of the crash. This information can then be loaded into computing system 103 so as to allow computing system 103 to pick up the operations of computing system 102 from a time just prior to the crash.

The exact algorithm by which state changes are updated into database 104 from computing system 102 may vary from embodiment to embodiment. For example, according to one embodiment, the components whose methods were involved in a transaction (such as a distributed transaction) are updated in database 104 upon completion of the transaction. According to another embodiment, a component is updated in database 104 upon completion of any of the component's methods that change state. In environments where multiple active servers can reach a same database, changes to components that represent persistent data should be updated into a database anyway in order to comply with basic "ACID" principles of persistent data management. Therefore, in such cases, there is no need to store persistent data components "on top of" a scheme that saves the state of component method variables.

2.0 Component Interfaces

Figure 2:
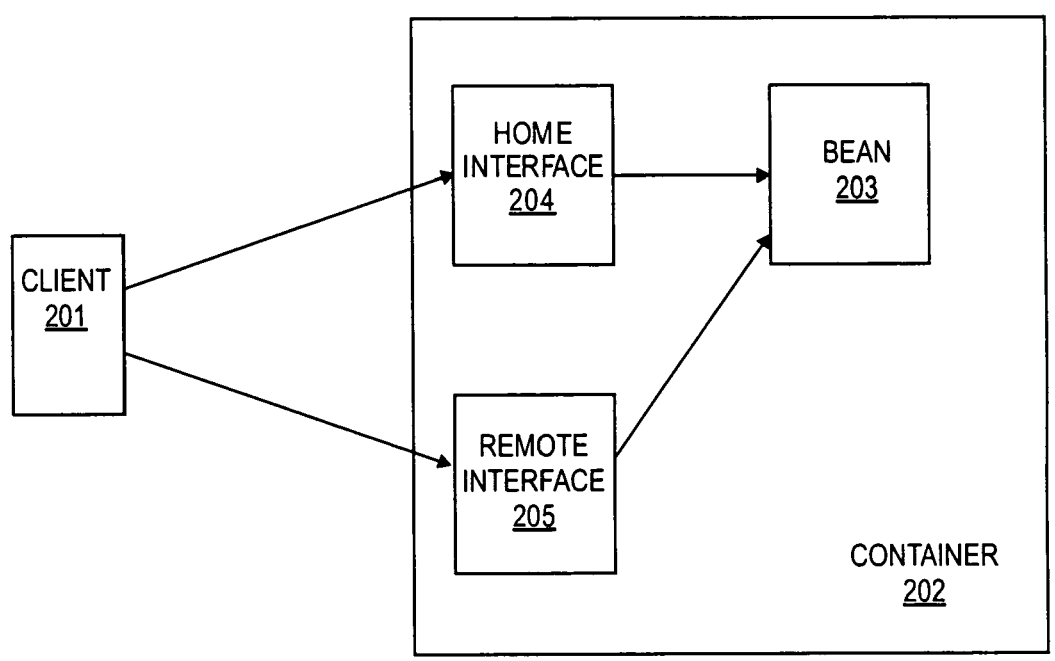
FIG. 2 shows a component being accessed through a communication session.

FIG. 2 shows a situation that is at least applicable to an Enterprise Java Beans (EJB) environment. According to FIG. 2, a software component which includes "bean" 203 is used by a client 201 over the course of a communication session. Generally, "beans" are the components within an EJB environment. Communication sessions are discussed in detail in Section 3.0 which immediately follows this section.

A feature of software components such as bean 203 is the presence of one or more interfaces for using the bean 203. An interface is typically deemed associated with the component itself. That is, the component depicted in FIG. 2 may be viewed as being bean 203 having interfaces 204, 205. The bean 203 contains the substantive methods of the component (i.e., the one or more methods for which the bean was created). Interfaces are used by the entities that use the bean (such as client 201).

The component of FIG. 2 depicts a component that is consistent with existing EJB specifications in that both a home interface 204 and a remote interface 205 are depicted. According to existing EJB specifications, a home interface 204 is used for rudimentary functions involving the accessibility of its corresponding bean 203 (such as "locate" bean instance 203, "create" bean instance 203; and "delete" bean instance 203); and, a remote interface 205 is used for invoking the substantive methods of its corresponding bean instance 203 (e.g., "calculate interest", "calculate principle", etc. for a bean instance containing financing methods).

Therefore, a typical communication session involving client 201 and bean instance 203 would entail an initial communication from client 201 to the bean instance's home interface 204 (e.g., in order to find or create the bean instance 203) followed by subsequent communications between the client 201 and remote interface 205 (e.g., in order for the client 203 to use the substantive methods of the bean instance 203). Possibly, a final communication between the client 201 and bean 203 would transpire through the home interface 204 to delete the bean instance 203.

According to existing EJB specifications, the client 201 is not able to communicate with the bean instance 203 directly (i.e., is only able to use the bean instance 203 through interfaces 204, 205); and, each bean has only one home interface but is capable of having multiple remote interfaces (e.g., one remote interface for each separate client that is engaged in a communication session with).

It is important to emphasize that although the above described component was consistent with existing EJB specifications other component based software technologies may be able to take advantage of the teachings being described herein even though the components of these other technologies do not conform to existing EJB specifications.

3.0 Saving the State of a Communication Session

According to known schemes, various types of "communication sessions" cannot be restored after a crash of a computing system that is involved in the communication session. This is so because certain variables used to implement the communication session cannot be serialized and stored into a backup storage device. A communication session is a communicative exchange between two software entities over a network. Thus, referring to FIG. 1, if active server 102 was involved in a communication session within another software entity over a network (not shown) when it crashed, the redundant server 103 would not be able to restore the communication because certain variables that were used to maintain the communication session were not serialized and stored into backup storage 104.

As indicated above, various forms of communication sessions exist. A first type of communication session, for example, is an HTTP communication session. An HTTP communication session (noting that HTTP stands for "Hypertext Transfer Protocol") is a communication session where the communicative exchange conforms to the HTTP protocol.

A second type of communication session is a client-server communication session. A client-server communication session is a communication session where a network resides between a client and a server. A client is simply a software entity that invokes the use of another software entity that resides on the server. Although the HTTP protocol can be used to support a client-server communication session (i.e., the client-server communication session is also an HTTP communication session), other protocols may be used to support a client-server communication session (e.g., Remote Method Invocation (RMI) in the case of client-server relationships that are setup to implement distributed computing).

In the specific case of Enterprise Java Beans (EJB), HTTP communication sessions cannot be restored because the objects that represent bean interfaces (e.g., an object that represents a home interface, an object that represents a remote interface, etc.) are not serializable. As a consequence of these objects not being serializable, HTTP session objects (each of which represent a particular HTTP session) cannot be serialized because they contain references to non serializable bean interfaces. Because the HTTP session objects are not serialized, the HTTP session cannot be restored.

Moreover, communication sessions entertained by "stateful session beans" (which typically correspond to client-server communication sessions) cannot be restored for similar reasons. In particular, a "stateful session bean" that is involved in a communication session may contain a reference to one or more objects that, like the bean interface objects, are non serializable. These non serializable objects may include User Transaction objects, Context objects, Initial Context objects, and Session Context objects. Because these objects are not serializable, "stateful session beans" are not serialized. A discussion of "stateful" and "session" is provided in more detail below.

Thus, at least in the case of both HTTP communication sessions and communication sessions involving "stateful session beans", the communication sessions cannot be restored because objects that are imperative to the communication session (e.g., an HTTP session object in the case of an HTTP communication session and an object that represents a "stateful session bean" in the case of a communication session that involves a "stateful session bean") contain references to non-serializable objects. In a sense, if a references points to a non-serializable object, the reference itself is deemed as non-serializable information. Therefore, HTTP session objects and "stateful session bean" objects are not serialized because they contain non-serializable information.

A solution to the problem of restoring communication session information that is deemed non serializable is to place this information into one or more serializable objects. By placing this information into serializable object(s), the information can be serialized, "backed up" on external storage, and restored on another system. Because the references are capable of restored; then, HTTP session objects and stateful session beans can also be restored by being serialized, stored and deserialized. FIGS. 3 through 6 describe various techniques for restoring communication session information in this manner.

Figure 3:
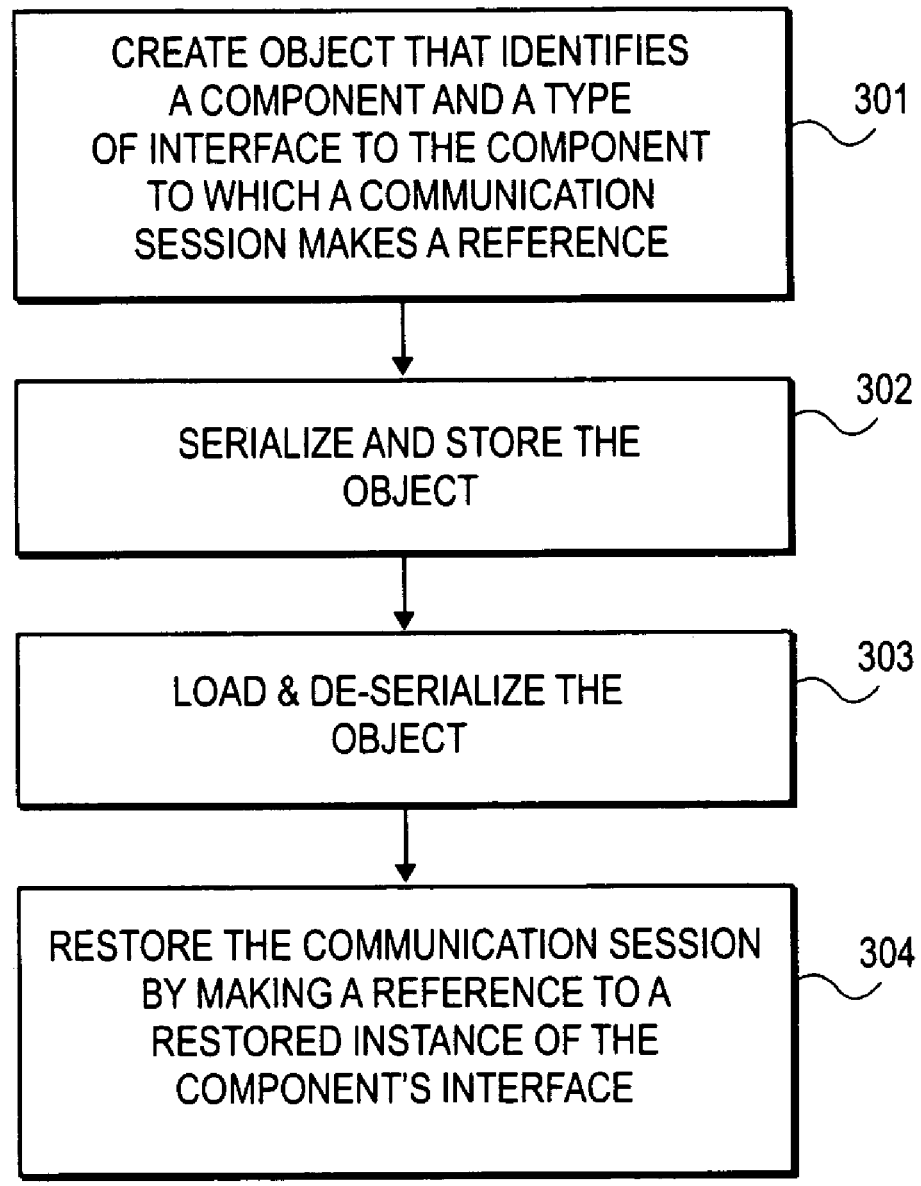
FIG. 3 shows a first method for restoring a communication session.
Figure 4:
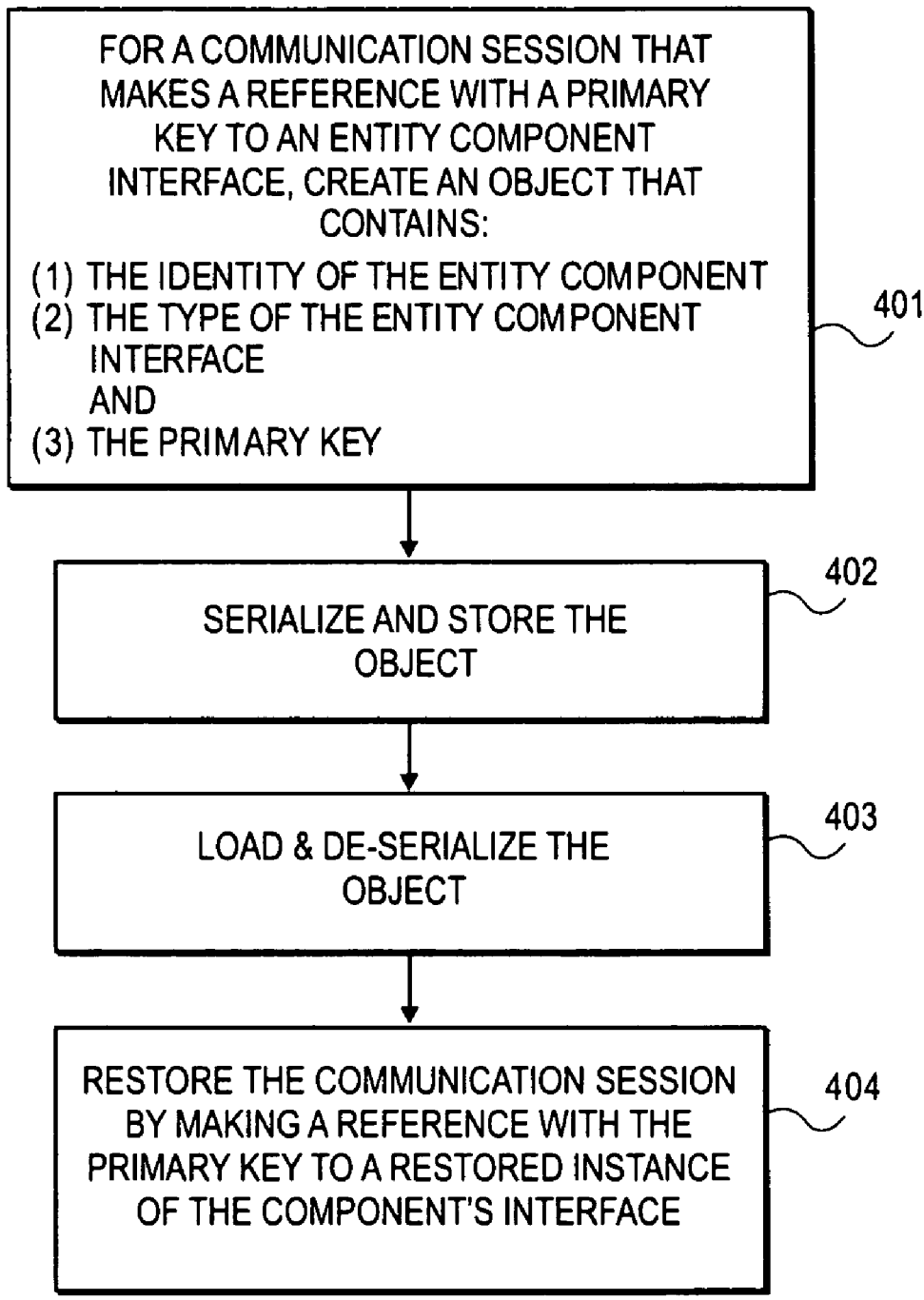
FIG. 4 shows a second method for restoring a communication session.

In particular, because the discussion concerning FIGS. 3 and 4 concerns restoring a reference made to a non serializable component interface object, the discussion concerning FIGS. 3 and 4 can be used at least to address the problem of restoring of HTTP communication sessions in an EJB environment. Moreover, because the discussion concerning FIGS. 5 and 6 concerns restoring a reference made by a "stateful session" bean to a non-serializable object, the discussion concerning FIGS. 5 and 6 can at least be used to address the problem of restoring a communication session that involves a "stateful session" bean. Each of these are discussed in sections 3.0 and 4.0, respectively.

4.0 Restoring a Reference to a Non-Serializable Component Interface Object

FIG. 3 shows a methodology for restoring, onto a redundant computing system after a crash of an active computing system that entertains a communication session, a reference to a non serializable component interface that was used by the communication session upon the active computing system prior to its crash. According to the methodology of FIG. 3, for a communication session reference to a particular non-serializable interface object (e.g., a home interface object or a remote interface object) of a particular component (e.g., a particular EJB bean), a serializable object is created that identifies both the component and the interface.

For example, in an EJB environment, a serializable object is created having a text string that includes the "JNDI" name for the bean instance that is referred to by the reference and the identity of the particular type of interface (e.g., "[JNDI_Name]_HOME" or "[JNDI_Name]_REMOTE") that is referred to by the reference. As is known in the art, the JNDI name of a particular bean essentially corresponds to the "name" of the particular bean; and, the JNDI name can be used to find an appropriate container on the redundant server where the particular bean is to be restored.

Thus, for example, in one EJB embodiment, if an active HTTP communication session refers to the home interface of a bean of name [JNDI_Name], a string "[JNDI_Name]_Home" will be contained by the serializable object created in sequence 301 of FIG. 3. Likewise, in another EJB embodiment, if an active HTTP communication session refers to the remote interface of a bean of name [JNDI_Name], a string "[JNDI_Name]_Remote" will be contained by the serializable object created in sequence 301 of FIG. 3.

Once a serializable object is created 301 that identifies a component bean interface that is involved in a communication session, the created object 301 is serialized and stored outside the computing system (e.g., in database 104 of FIG. 1a). If the component itself (e.g., bean instance 203 of FIG. 2) having the identified name (e.g., [JNDI_Name]) is a "stateful" component (e.g., a stateful session bean), it is also stored outside the active computing system. A stateful component is a component that contains state information that needs to be stored if the state of an active system is to be restored on a redundant system. A discussion of the treatment of non stateful components is provided after FIGS. 3 and 4 have been discussed.

If a crash of the active computing system occurs after sequence 302, the serialized object data is loaded and deserialized into the redundant computing system 303. The deserialization causes the serializable object that was originally created in the active computing system during sequence 301 to be recreated in the redundant computing system. The information contained within this object is then used to create a reference to the indicated interface of the indicated component. The identity of the component within the string (e.g., [JNDI_Name]) is used to find an appropriate container on the redundant server where the component is to be restored. The interface identifier of the string (e.g., "HOME" or "REMOTE") is used to create both an interface of the corresponding type for the component and a reference to the interface for executing the communication session that is being restored 304.

For example, in an EJB embodiment, if the information contained in the object is "[JNDI_Name]_HOME"; then, the bean of name [JNDI_Name] will be restored on the redundant server in the appropriate container; and, a home interface for the bean and a reference to the home interface will be created for the communication session being restored. Likewise, in another EJB embodiment, if the information contained in the object is "[JNDI_Name]_REMOTE"; then, the bean of name [JNDI_Name] will be restored on the redundant server in the appropriate container; and, a remote interface for the bean and a reference to the remote interface will be created for the communication session being restored. In both cases, if an HTTP communication session is being restored, the reference will be created in the deserialized version of the communication session's HTTP object.

In an embodiment where the component instance at issue is a "stateless" component (i.e., a component that does not contain state information and therefore does not need to be continuously backed up into a database), the new component instance is created on the redundant computing system rather than being loaded onto it. Here, since the component did not contain valuable state information, it was not backed up on the database. Moreover, since the redundant server is assumed to have classfiles for each component so that any component instance can be created on the redundant server, the redundant server simply uses the name found in the string (e.g., [JNDI_Name]) as a basis for creating a component instance and assigning it that name. The string's interface type specification is used to create an instance of the interface (having the identified type such as home or remote) to the created component instance; and, also implement a reference to it.

Directory services are a species of naming services that provide additional information along with the item having the name that was submitted to the service (e.g., a directory of all the item's sub-items). Many different types of naming and directory services exist such as File Systems, RMI Registry, CORBA COS Naming Service, DNS, eDirectory, iPlanet Directory Server, and Microsoft Active Directory. It is envisioned that name information workable with any of these naming services (as well as any others that may exist) can be suitably formatted for use in the scheme discussed above.

The distinction of stateful vs. stateless components indicates that components containing state should be stored externally to the active computing system but that stateless components need not be stored externally to the active computing system (e.g., because they can be recreated by the redundant computing system). According to some environments, there exist three primary component types: 1) "stateful" session; 2) "stateless" session; and, 3) "stateful" entity. For example, EJB has three primary bean types: stateful session; stateless session; and entity.

Stateful components contain state information and therefore should be backed up outside the active computing system. Stateless components do not contain state information and therefore do not need to be backed up outside the active computing system. Session components implement application (e.g., business logic) methods (typically through a client-server communication session). The discussion concerning FIG. 3 can at least be applied to stateful and stateless session components.

FIG. 4 shows a restoration scheme that is similar to that discussed above with respect to FIG. 3 but that is specifically directed to entity components. Entity components represent persistent data. Since persistent data is normally stored outside an active server, entity components represent information that is already persisted in an external database. Therefore entity bean instances do not need to be serialized. Serializing only the "primary key" ensures that the same entity can be loaded on the redundant server from an external database during restoration.

For example, as discussed above with respect to EJB, an "entity" bean is a component used to represent an item of persistent data. Because of the use of persistent data with relational databases, entity beans are referenced with a "primary key" (which can be viewed, for example, as a specific location of a row of data within a relational database table). Because entity beans are referred to with a primary key, the information that is contained by an object which is created 401 for purposes of restoring a reference to a entity bean is made to include its corresponding primary key. For simplicity the term "entity component" will be used to refer to a component that is used as a representation of persistent data.

The methodology of FIG. 4 works very similar to that as that described in FIG. 3 except that the created object 401 includes a primary key for the applicable entity component along with the name of the entity component instance and the type of interface to which the communication session being restored makes a reference. The object is serialized and stored outside the active computing system 402 prior to the failure of the active computing system; and, is deserialized and loaded into the redundant computing system 403 after the failure of the active computing system.

The deserialization causes the object originally created in the active computing system during sequence 401 to be recreated in the redundant computing system. The information contained within this object is then used to create a reference to the indicated interface of the indicated entity component. In one embodiment, the appropriate container for the entity component on the redundant server is found within the string (e.g., via [JNDI_Name]); and, the entity component itself is loaded into the redundant server from external storage with the primary key information.

The interface identifier of the string (e.g., "HOME" or "REMOTE") is used to create both an interface of the corresponding type for the entity component and a reference to the interface for executing the communication session that is being restored 404.

For example, in an EJB embodiment, if the information contained in the object is "[JNDI_Name]_HOME"; then, the entity bean will be restored in the appropriate container of the redundant computing system through the use of the JNDI information and the "HOME" portion of the string will cause a home interface to be created. Likewise, in another EJB embodiment, if the information contained in the object is "[JNDI_Name]_REMOTE" plus the primary key information; then, the entity bean will be restored in the appropriate container of the redundant computing system through the use of the JNDI information and the "REMOTE" portion of the string will cause a home interface to be created. The primary key information is used to fetch the entity component from the external database.

Figure 5:
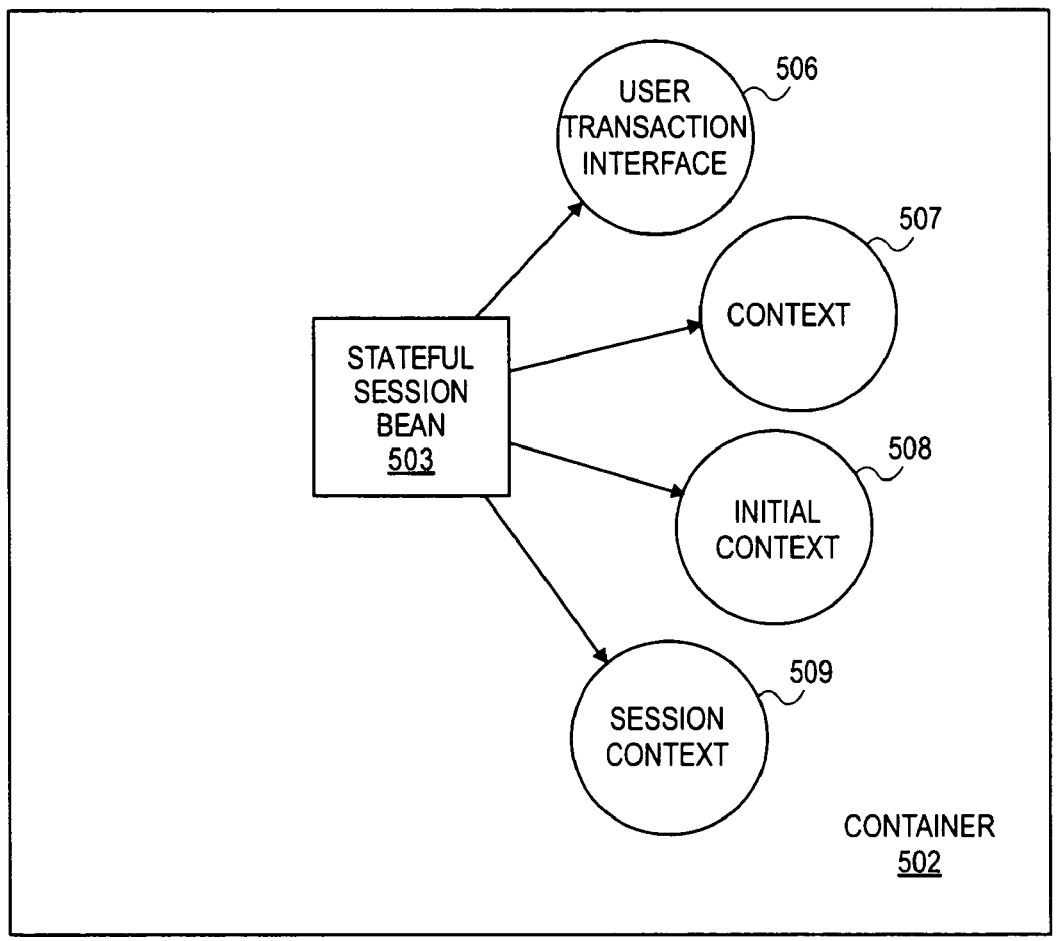
FIG. 5 shows a component involved in a communication session with references between other objects.

5.0 Restoration of Reference Made by a Stateful Session Component to a Non-Serializable Object FIG. 5 shows additional references that may be made from an instance of a stateful session component 503 that is involved in a communication session. References to four different non-serializable objects are shown: 1) a user transaction interface object 506; 2) a naming and directory service context object 507; 3) a naming and directory service initial context object 508; and, 4) a session context object 509. In an EJB environment, none to all of these references may exist for any stateful session bean instance that is involved in a communication session.

The user transaction interface object has methods for implementing a distributed transaction (e.g., "rollback" and "commit"). Thus, if the component instance 503 is involved in a distributed transaction, it is apt to have a reference to/from this object. The context and initial context objects 507, 508 are associated with a naming and directory service. Thus, the context and/or initial context objects are likely to be referenced to/from the stateful session component instance 503 if the component instance is using the naming service as part of the communication session.

A context object 507 contains methods that are specific to certain type of naming and directory service (e.g., File Systems, RMI Registry, CORBA COS Naming Service, DNS, eDirectory, iPlanet Directory Server, and Microsoft Active Directory). JNDI can presently be viewed as a common API through which a plurality of different types of naming and directory services can be engaged. Thus, once a particular type of naming service is defined for use, JNDI provides the context object 507 which contains the lookup and binding methods used to implement the specific type of naming service. The initial context object 508 contains methods used to obtain the context object 507. The initial context object is typically used as a starting point for using the naming directory service.

The session context object 509 helps to define the environment of the session bean instance 503. For example, the session context object 509 may contain methods that: 1) enable the stateful session component instance 503 to access its own interfaces; and/or, 2) enable the component interface to set a rollback condition if it experiences an error; and/or, 3) to inquire whether a commit is appropriate.

Figure 6:
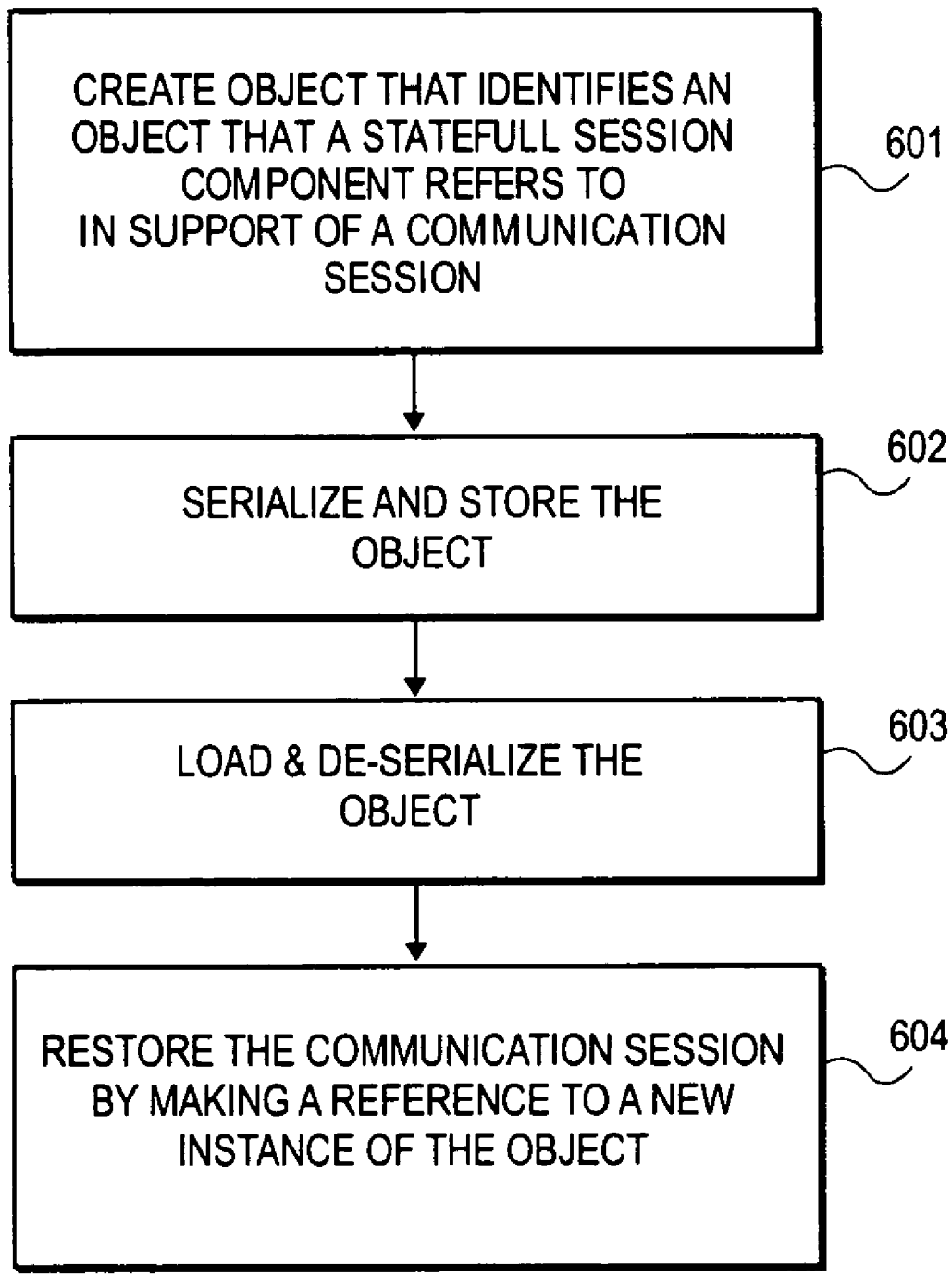
FIG. 6 shows a methodology for restoring the objects observed in FIG. 5.

FIG. 6 shows an embodiment of a methodology for backing up any of the references to these non-serializable objects 506, 507, 508, 509. Like the methods described in FIGS. 3 and 4, the methodology of FIG. 6 creates 601 a serializable object containing information sufficient to restore a reference on a redundant computing system. Then, the serializable object is serialized and stored into an external database 602. The stateful session component is also serialized and stored into external database storage. After a failure of the active system, the object is deserialized and loaded onto the redundant computing system 603. Then, the object is used to restore the reference on the redundant system. The stateful session component is also loaded onto the redundant server from the external database.

Here, it is assumed that objects 506, 507, 508, 509 can be re-created on the redundant system; and, the serialization and storage of the object created in sequence 601 is assumed to be made in conjunction with the serialization of the stateful session component instance itself 503. Therefore the content of the information in the object created in sequence 601 need only identify the type of object involved in the reference (e.g., strings of: "UT" for the user transaction interface object 506; "CTX" for the context object 507; "INT" for the initial context object 508; and, "SC" for the session context object).

That is, the specific reference to be made is straightforward because: 1) the object created on the redundant system in sequence 604 is known by the redundant computing system to be associated with the stateful session component instance 503 being restored; and, 2) there is only one object that the information contained by the object created in sequence 601 can possibly be referring to. For example, in one embodiment, there is only one user transaction object 506 maintained by the redundant system container within which the stateful session component instance is being restored. Therefore the string "UT" is sufficient to restore a reference between the component instance 503 being restored and the sole user transaction object 506. The restored references are made in the restored stateful session bean.

7.0 Closing Statements

It is important to note that although the above description only discussed home and remote interfaces (which in an EJB environment are used for accesses made to a bean from outside its container), the same techniques described above may be used to restore references made to "local home" and "local" interfaces as well. A local home reference behaves similar to the above described home interface—except that it is used for accesses made to a bean from within the bean's container. Likewise, a local interface behaves similar to the above described remote interface—except, again, that it is used for accesses made to a bean from within the bean's container.

The computing systems referred to above may be implemented as servers. The servers may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
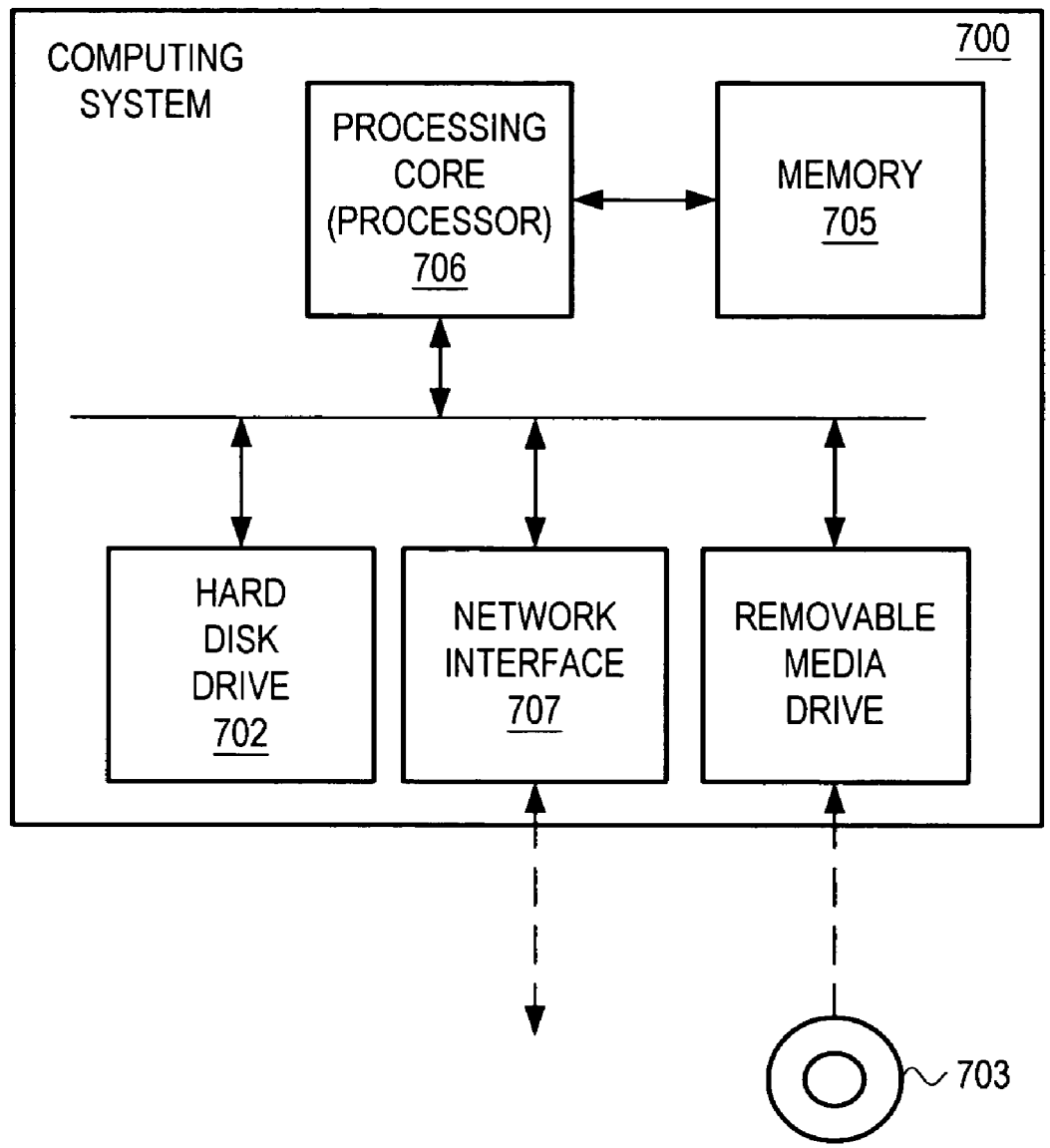
FIG. 7 shows an embodiment of a computing system.

FIG. 7 is a block diagram of a computing system 700 that can execute program code stored by an article of manufacture. It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
 performing the following on a computing system:
 creating an object containing information that describes a reference, said reference used to implement a communication session;
 serializing said object into a byte stream;
 storing said byte stream into a storage entity outside said computing system;
 in response to said computing system suffering a failure, sending said byte stream from said storage entity to a second computing system, said storage entity also outside said second computing system;
 recreating said object within said second computing system; and,
 recreating said reference on said second computing system with information from said recreated object.

2. The method of claim 1 wherein said communication session is selected from the group, consisting of:
 a) an HTTP session; and,
 b) a communication session involving a stateful session bean.

3. The method of claim 2 wherein said information further comprises information that identifies a bean and that identifies an interface to said bean, said interface and said bean involved in said communication session.

4. The method of claim 3 wherein said information that identifies an interface to said bean further comprises information that identifies a home interface to said bean.

5. The method of claim 3 wherein said information that identifies an interface to said bean further comprises information that identifies a remote interface to said bean.

6. The method of claim 3 wherein said information that identifies a bean further comprises JNDI information.

7. The method of claim 6 wherein said information that identifies an interface to said bean further comprises information that identifies a home interface to said bean.

8. The method of claim 7 wherein said bean is a stateful session bean.

9. The method of claim 7 wherein said bean is a stateless session bean.

10. The method of claim 7 wherein said bean is an entity bean.

11. The method of claim 10 wherein said information further comprises said entity bean's primary key.

12. The method of claim 7 wherein said information that identifies an interface to said bean further comprises information that identifies a remote interface to said bean.

13. The method of claim 12 wherein said bean is a stateful session bean.

14. The method of claim 12 wherein said bean is a stateless session bean.

15. The method of claim 12 wherein said bean is an entity bean.

16. The method of claim 15 wherein said information further comprises said entity bean's primary key.

17. The method of claim 1 wherein said information further comprises information that identifies an instance of a component and that identifies an interface to said component instance, said interface and said component instance involved in said communication session.

18. The method of claim 17 wherein said information that identifies an interface to said component further comprises information that identifies an interface that is used to invoke an action selected from the group consisting of:
 finding said component instance;
 creating said component instance; and
 deleting said component instance.

19. The method of claim 18 wherein said component is a stateful session component.

20. The method of claim 18 wherein said component is a stateless session component.

21. The method of claim 18 wherein said component is an entity component.

22. The method of claim 21 wherein said information further comprises said entity component's primary key.

23. The method of claim 17 wherein said information that identifies an interface to said component instance further comprises information that identifies an interface that is used to invoke a method performed by said component instance.

24. The method of claim 23 wherein said component instance is a stateful session component instance.

25. The method of claim 23 wherein said component instance is a stateless session component instance.

26. The method of claim 23 wherein said component instance is an entity component.

27. The method of claim 26 wherein said information further comprises said entity component's primary key.

28. The method of claim 1 wherein said communication session is used to execute and application on two different computing systems.

29. The method of claim 1 wherein said reference is between an instance of a stateful session component and an object that contains distributed transaction methods selected from the group consisting of:
 commit; and
 rollback.

30. The method of claim 1 wherein said reference is between an instance of a stateful session component and an object containing methods for using a specific type of naming service.

31. The method of claim 1 wherein said reference is between an instance of a stateful session component and an object that contains methods used when a naming service API is initially invoked.

32. The method of claim 1 wherein said reference is between an instance of a stateful session component and an object containing information pertaining to said communication session.

33. An article of manufacture including program code which; when processed by a machine, causes the machine to perform a method, the method comprising:
 performing the following on a computing system:
 creating an object containing information that describes a reference, said reference used to implement a communication session;
 serializing said object into a byte stream;
 storing said byte stream into a storage entity outside said computing system;
 in response to said computing system suffering a failure, sending said byte stream from said storage entity to a second computing system, said storage entity also outside said second computing system;
 recreating said object within said second computing system; and,
 recreating said reference on said second computing system with information from said recreated object.

34. The article of manufacture of claim 33 wherein said communication session is selected from the group, consisting of:
   a) an HTTP session; and,
   b) a communication session involving a stateful session bean.

35. The article of manufacture of claim 34 wherein said information further comprises information that identifies a bean and that identifies an interface to said bean, said interface and said bean involved in said communication session.

36. The article of manufacture of claim 35 wherein said information that identifies an interface to said bean further comprises information that identifies a home interface to said bean.

37. The article of manufacture of claim 35 wherein said information that identifies an interface to said bean further comprises information that identifies a remote interface to said bean.

38. The article of manufacture of claim 35 wherein said information that identifies a bean further comprises JNDI information.

39. The article of manufacture of claim 38 wherein said information that identifies an interface to said bean further comprises information that identifies a home interface to said bean.

40. The article of manufacture of claim 39 wherein said bean is a stateful session bean.

41. The article of manufacture of claim 39 wherein said bean is a stateless session bean.

42. The article of manufacture of claim 39 wherein said bean is an entity bean.

43. The article of manufacture of claim 42 wherein said information further comprises said entity bean's primary key.

44. The article of manufacture of claim 39 wherein said information that identifies an interface to said bean further comprises information that identifies a remote interface to said bean.

45. The article of manufacture of claim 44 wherein said bean is a stateful session bean.

46. The article of manufacture of claim 44 wherein said bean is a stateless session bean.

47. The article of manufacture of claim 44 wherein said bean is an entity bean.

48. The article of manufacture of claim 47 wherein said information further comprises said entity bean's primary key.

49. The article of manufacture of claim 33 wherein said information further comprises information that identifies a component and that identifies an interface to said component, said interface and said component involved in said communication session.

50. The article of manufacture of claim 49 wherein said information that identifies an interface to said component further comprises information that identifies an interface that is used to invoke an action selected from the group consisting of:
   finding said component;
   creating said component; and
   deleting said component.

51. The article of manufacture of claim 50 wherein said component is a stateful session component.

52. The article of manufacture of claim 50 wherein said component is a stateless session component.

53. The article of manufacture of claim 50 wherein said component is an entity component.

54. The article of manufacture of claim 53 wherein said information further comprises said entity component's primary key.

55. The article of manufacture of claim 49 wherein said information that identifies an interface to said component further comprises information that identifies an interface that is used to invoke a method performed by said component.

56. The article of manufacture of claim 55 wherein said component is a stateful session component.

57. The article of manufacture of claim 55 wherein said component is a stateless session component.

58. The article of manufacture of claim 55 wherein said component is an entity component.

59. The article of manufacture of claim 58 wherein said information further comprises said entity component's primary key.

60. The article of manufacture of claim 33 wherein said communication session is used to execute and application on two different computing systems.

61. The article of manufacture of claim 33 wherein said reference is between a stateful session component and an object that contains distributed transaction methods selected from the group consisting of:
   commit; and
   rollback.

62. The article of manufacture of claim 33 wherein said reference is between an instance of a stateful session component and an object containing methods for using a specific type of naming service.

63. The article of manufacture of claim 33 wherein said reference is between a stateful session component and an object that contains methods used when a naming service API is initially invoked.

64. The article of manufacture of claim 33 wherein said reference is between a stateful session component and an object containing information pertaining to said communication session.

65. A computing system comprising program code disposed on a computer readable medium, said program code capable of being processed by said computing system to perform a method, said method comprising:
   performing the following on said computing system:
   creating an object containing information that describes a reference, said reference used to implement a communication session;
   serializing said object into a byte stream;
   storing said byte stream into a storage entity outside said computing system;
   in response to said computing system suffering a failure, sending said byte stream from said storage entity to a second computing system, said storage entity also outside said second computing system;
   recreating said object within said second computing system; and,
   recreating said reference on said second computing system with information from said recreated object.

66. The computing system of claim 65 wherein said information further comprises information that identifies an instance of a component and that identifies an interface to said component, said interface and said component involved in said communication session.

67. The computing system of claim 66 wherein said information that identifies an interface to said component further comprises information that identifies an interface that is used to invoke an action selected from the group consisting of:
  finding said component;
  creating said component; and
  deleting said component.

68. The computing system of claim 67 wherein said component instance is a session component.

69. The computing system of claim 67 wherein said component instance is a stateless session component.

70. The computing system of claim 67 wherein said component is an entity component.

71. The computing system of claim 70 wherein said information further comprises said entity component's primary key.

72. The computing system of claim 66 wherein said information that identifies an interface to said component further comprises information that identifies an interface that is used to invoke a method performed by said component.

73. The computing system of claim 72 wherein said component is a stateful session component.

74. The computing system of claim 72 wherein said component is a stateless session component.

75. The computing system of claim 72 wherein said component is an entity component.

76. The computing system of claim 75 wherein said information further comprises said entity component's primary key.

77. The computing system of claim 65 wherein said communication session is used to execute and application on two different computing systems.

* * * * *